United States Patent
Das et al.

(10) Patent No.: US 7,489,929 B2
(45) Date of Patent: Feb. 10, 2009

(54) HARD HANDOFF PROCEDURE FOR DEDICATED AND HIGH SPEED SHARED CHANNELS

(75) Inventors: Suman Das, Scotch Plains, NJ (US); Ali Masoomzadeh-Fard, Marlboro, NJ (US); Martin H. Meyers, Montclair, NJ (US); Harish Viswanathan, Morristown, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 314 days.

(21) Appl. No.: 11/095,043

(22) Filed: Mar. 31, 2005

(65) Prior Publication Data

US 2006/0223535 A1    Oct. 5, 2006

(51) Int. Cl.
    *H04Q 7/20*    (2006.01)
(52) U.S. Cl. ............... 455/436; 455/439; 455/442; 455/443; 455/444; 455/432.1; 455/433; 455/435.1; 455/435.2
(58) Field of Classification Search ............... 455/439, 455/438, 436, 437, 442, 443, 444, 67.13
See application file for complete search history.

(56) References Cited

U.S. PATENT DOCUMENTS 6,609,003 B1* 8/2003 Park et al. ............... 455/436

| | | | |
|---|---|---|---|
| 2003/0060230 A1* | 3/2003 | Soliman | 455/556 |
| 2003/0147370 A1 | 8/2003 | Wu | |
| 2005/0266847 A1* | 12/2005 | Tinnakornsrisuphap et al. | 455/436 |
| 2006/0135075 A1* | 6/2006 | Tee et al. | 455/67.13 |

FOREIGN PATENT DOCUMENTS

| EP | 1 377 101 A1 | 1/2004 |
|---|---|---|
| EP | 1 432 262 A1 | 6/2004 |
| WO | WO 01/99291 A2 | 12/2001 |

OTHER PUBLICATIONS

PCT International Search Report for International Application No. PCT/US2006/009715, filed Mar. 17, 2006.
Written Opinion of the International Searching Authority relating to International Application No. PCT/US2006/009715, filed Mar. 17, 2006.

* cited by examiner

*Primary Examiner*—David Q Nguyen

(57) ABSTRACT

A wireless communication network (20) utilizes a hard handoff procedure for switching between cells serving a mobile station (40). In a disclosed example, the existing link between the mobile station (40) and a serving base station (38) is not released until a new link between a target base station (32) and a mobile station (40) is established. At the same time, however, the mobile station maintains only one base station or link within its active set at all times. The disclosed example is useful for dedicated channel and shared channel communications in CDMA systems, for example.

15 Claims, 2 Drawing Sheets

HARD HANDOFF PROCEDURE FOR DEDICATED AND HIGH SPEED SHARED CHANNELS

FIELD OF THE INVENTION

This invention generally relates to telecommunications. More particularly, this invention relates to wireless communication systems.

DESCRIPTION OF THE RELATED ART

Wireless communication systems are well known and in widespread use. Typical systems include a plurality of base stations arranged to serve specific geographic areas or cells. An individual can use a mobile station to communicate through the wireless communication system as their mobile station communicates with a base station serving the cell in which they are currently located.

As a mobile station moves from one cell to another, communications for that mobile station should be handled by different base stations at different times. As a mobile station moves from one cell to another cell, the communications for that mobile station are transferred from the base station serving the one cell to the base station serving the other cell. The process of transferring communications for a mobile station between base stations is known as "handoff."

Typically, a mobile station monitors a pilot signal or other signal strength indicator to determine what base station is providing a useful signal for communications. As the mobile station approaches the edge of the cell in which it is currently located, the signal from the base station serving that cell typically weakens while a signal from a base station in an adjacent cell typically becomes stronger. In many instances, a mobile station recognizes these conditions and requests a handoff to the next base station. The requested base station is often called a target base station. According to existing communication protocols, mobile stations may request a handoff to one or more base stations based upon the relative measured strengths of the pilot signals of the base stations.

Wireless communication networks can also trigger handoff procedures based upon periodic measurement reports from mobile stations or for other reasons such as bearer traffic management in one or more cells.

One type of wireless communication system is known as a Code Division Multiple Access (CDMA) system. Handoffs used in CDMA systems are known as "soft" handoffs. A mobile station and a wireless network that use soft handoff procedures establish communication with a target base station before terminating communication with an existing or currently serving base station. During a soft handoff procedure, a mobile station is in simultaneous communication with more than one base station. Soft handoff procedures typically are employed to ensure that there is no interruption of communication between the mobile station and the wireless network through at least one base station. Eventually, a soft handoff process is completed and the mobile station communicates only through the target base station, which becomes the existing or serving base station after the handoff is complete.

Soft handoff in CDMA systems is facilitated based on the pilot signal strength of several sets of base stations as determined by the mobile station. The sets of base stations typically maintained by a mobile station in a CDMA system include an active set, a neighbor set, a candidate set and a remaining set. The active set for a typical mobile station is the set of base stations through which active communication is established. The neighbor set is a set of base stations surrounding the active base stations and includes base stations that have a high probability of having a pilot signal strength of sufficient level to establish communication, but through which active communication is not yet established. The surrounding base stations that have such a pilot signal strength are members of the candidate set. Any one or more of the base stations within the candidate set may become the target base station for a handoff procedure. The remaining set is a set of base stations that are not included in any of the other three sets.

The network and the mobile station use the different sets of base stations to control a handoff procedure. During a typical soft handoff procedure, the active set contains more than one base station. The mobile station monitors the pilot signal strengths of the base stations in the active set, the candidate set, the neighbor set and the remaining set. During a soft handoff procedure, when a pilot signal strength of a base station in the neighbor or remaining set reaches a defined threshold level, that base station is added to the candidate set and removed from the neighbor or remaining set, for example.

In one example, a mobile station triggers the handoff procedure when the mobile station detects a relatively strong candidate pilot signal strength. The mobile station in such an example transmits a measurement report to a radio network controller by sending appropriate signals to the serving base station. The measurement report may be accompanied by a request to add the base station having the detected strong candidate pilot to the mobile station's active set. In other situations, handoff requests are transmitted along with periodic measurement reports provided by the mobile station. The radio network controller of the wireless communication network evaluates the mobile station measurement report to coordinate the processing of a soft handoff with the base stations associated with strong detected pilot signals.

The mobile station measurement report contains the measured pilot strength for a target base station that the mobile is requesting to be included in its active set. The radio network controller determines if that target base station has the appropriate resources available to serve that mobile station. If the target base station has appropriate resources (i.e., sufficient transmit power, bandwidth and data rate), the radio network controller sends a message to the mobile station informing the mobile station that the requested target base station can be added to the mobile station's active set. The mobile station responds by sending a confirmation message back to the radio network controller confirming that the active set has been updated and communication with that target base station, which has been added to the active set, can then begin.

In soft handoff procedures, the mobile station is in simultaneous communication, using a communication link comprising one or more communication channels, with the active set members. Eventually, the handoff process transfers communication to only one of the base stations in the active set. At that point, the mobile station has one communication link with the one base station within the active set. Such a communication link is also referred to as a "leg."

Typical soft handoff procedures may include adding a new leg to the active set, removing an existing leg from the active set or, if the active set is full, replacing an existing member of the active set with a new member. For each of these events during a handoff procedure, there is a hysteresis for a handoff decision. Typical hysteresis thresholds are on the order of 1 dB. If a member of the active set has a pilot signal strength, for example, that is 1 dB less than a candidate base station, the latter may become a member of the active set to replace an existing member when that threshold difference, which is specified by the selected replacement hysteresis, occurs.

Soft handoff procedures are used for dedicated channels in CDMA systems. High speed shared channels (SCH) are supported in 3G CDMA systems to increase throughput, reduce delay and achieve high peak rates. Soft handoff is typically avoided over such shared channels to decrease interference and increase system capacity. By avoiding soft handoff, strict latency requirements for such channels can also be relaxed. The signaling associated with such a handoff goes through a dedicated channel. Dedicated channels in CDMA systems utilize soft handoff procedures. Therefore, the handoff of the service over the SCH using signaling over the dedicated channel is generally considered reliable because the soft handoff procedure used on the dedicated channel allows for providing macrodiversity transmission.

A drawback associated with the current approach is that there is a cost associated with the dedicated channel being used in the soft handoff process for the higher layer signaling related to serving the SCH. With such procedures, more Walsh codes are used and strict synchronization between cells is required.

It has not previously been possible to complete a handoff for dedicated channels in CDMA systems without using soft handoff procedures with sufficient reliability. In the absence of soft handoff for a dedicated channel, the switch from one cell to another should be very quick to avoid dropping a call. The signaling associated with the handover should be reliable to avoid retransmissions that introduce additional delay. Moreover, when a current or existing cell signal quality is not good, it is possible for handoff signaling to fail to get through quickly enough before the current link quality becomes unreliable. Under some circumstances, this may result in a dropped call because switching to a better-situated base station depends upon fast and reliable handoff signaling between the mobile station and the wireless communication network. As mobile stations move at higher speeds, this problem becomes more prevalent.

There is a need for an improved technique for completing handoffs in CDMA systems. It would be beneficial to be able to avoid the use of resources required for soft handoff procedures. At the same time, any hard handoff procedure should be reliable enough to avoid dropped calls.

SUMMARY OF THE INVENTION

This invention addresses the need for an improved technique for completing handoffs in CDMA systems. A disclosed example method of communicating includes a hard handoff procedure that can be used for dedicated channels or high speed shared channels in CDMA systems.

An exemplary disclosed embodiment includes establishing a link between a target base station and a mobile station before releasing an existing link between the mobile station and another base station without having more than one base station in the mobile station's active set. In other words, the exemplary embodiment provides a make-before-break hard handoff that does not use soft combining in a mobile station and does not require frame selection.

One example method of communicating includes determining that a handoff is desired between a serving base station and a target base station. A new link between a mobile station and a target base station is then initiated. An active set update message is transmitted to the mobile station using an existing link between the serving base station and the mobile station. Uplink synchronization for the target base station for communicating with the mobile station is then achieved. At least one signal is eventually received over the new link indicating that the mobile station has processed the transmitted active set update message. After this, the existing link is released by the network and communication between the target base station and the mobile station over the new link begins.

In one example, an active set for the mobile station includes only one active link at all times.

One example method includes receiving an active set update message over an existing link between a mobile station and a serving base station. The active set update message indicates a handoff from the serving base station to a target base station. Physical layer control information is then received over the existing link for downlink synchronization between the mobile station and the target base station. Downlink synchronization is then achieved with the target base station responsive to the received physical layer control information. An active set update confirmation is transmitted through the new link and communication over the existing link is terminated after the active set update confirmation has been received by the target base station.

With such an example, an active set for the mobile station includes only one active link at all times.

The various features and advantages of this invention will become apparent to those skilled in the art from the following detailed description. The drawings that accompany the detailed description can be briefly described as follows.

DETAILED DESCRIPTION

Figure 1:
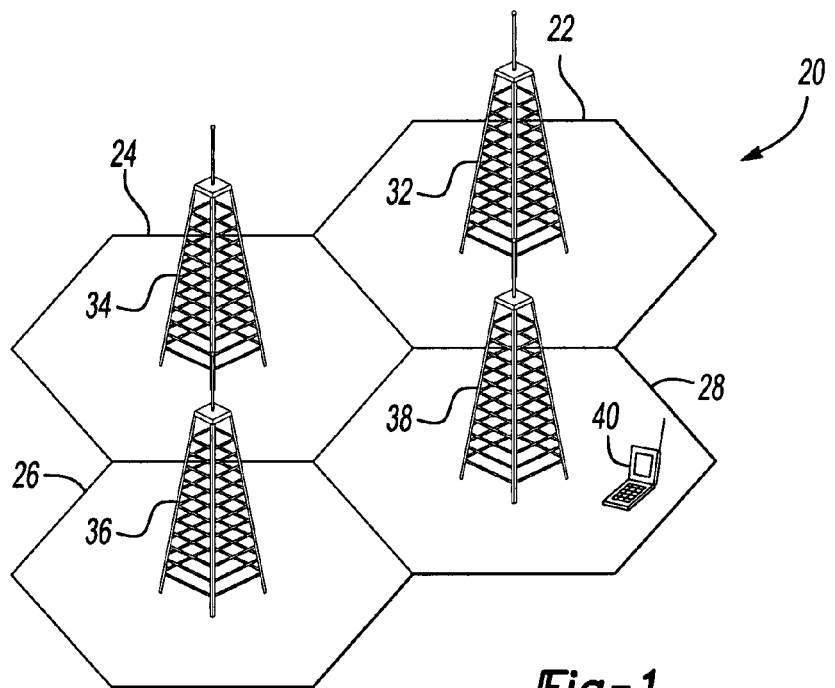
FIG. 1 schematically shows selected portions of a wireless communication network that utilizes a handoff procedure designed according to an embodiment of this invention.

FIG. 1 schematically shows selected portions of a wireless communication network 20. A plurality of cells 22, 24, 26 and 28 are served by base stations 32, 34, 36 and 38, respectively. The base stations 32-38 communicate with a radio network controller and other portions of a wireless communication network in a known manner.

A mobile station 40 is schematically shown within the geographic region or area of coverage of the cell 28. Communications between the mobile station 40 and another device using the wireless communication network occurs over an existing link between the base station 38 and the mobile station 40. The base station 38 in this instance is considered a serving base station or an existing base station for purposes of this description. The communication link between the mobile station 40 and the base station 38 under such circumstances is an existing leg or an existing link.

Eventually the mobile station 40 moves into another region corresponding to another one of the cells. As such movement occurs, a handoff between the existing base station 38 and a new or target base station serving the cell that the mobile station 40 is entering should occur. In traditional CDMA systems, a soft handoff procedure would have been used. With the disclosed example, a hard handoff procedure that includes making a connection over the new link before breaking the connection over the existing link allows the mobile station to have only one base station or link within an active set of the mobile station at all times. In other words, with the disclosed example, the mobile station 40 does not need to use soft combining and the base stations do not need to use frame selection.

Figure 3:
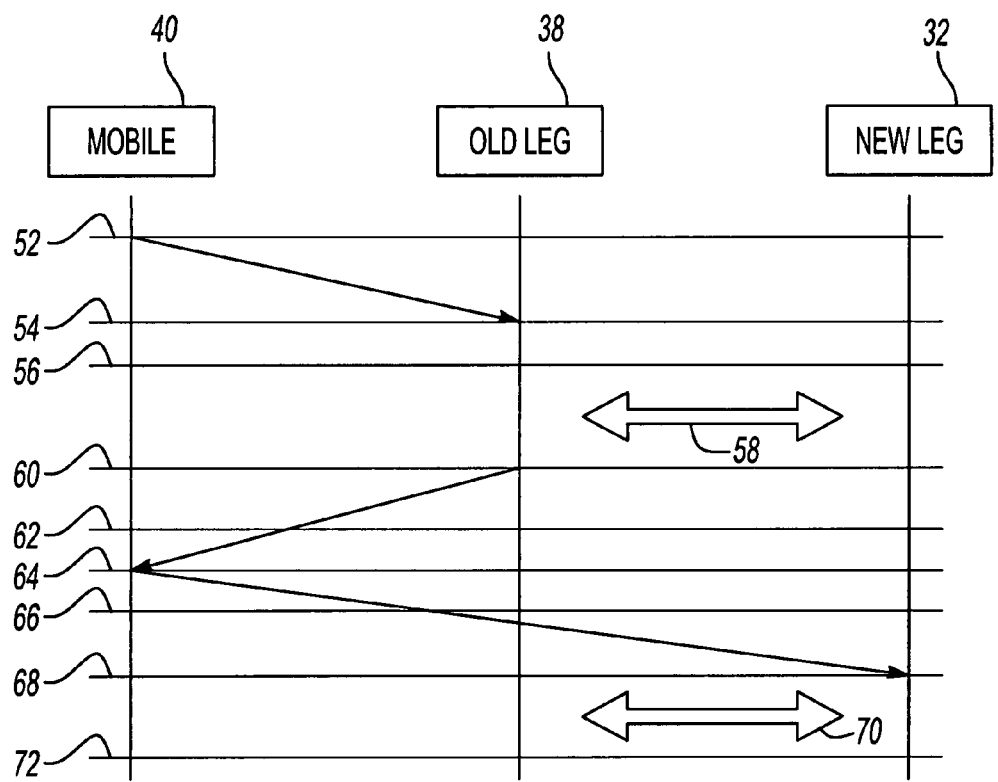
FIG. 3 is a timing diagram schematically showing various portions of an example handoff procedure.
Figure 2:
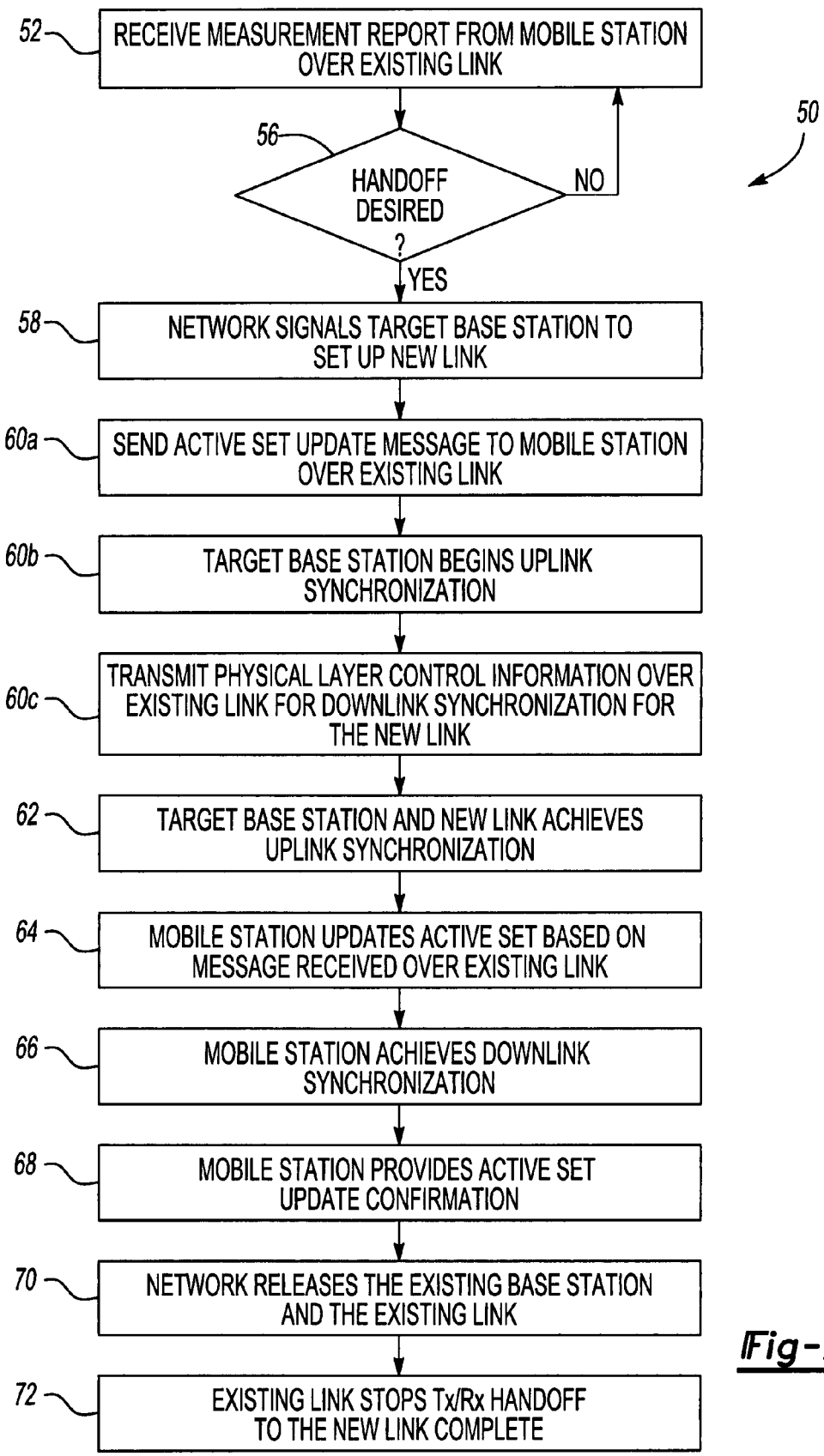
FIG. 2 is a flowchart diagram summarizing an example handoff procedure.

FIGS. 2 and 3 illustrate an example handoff procedure designed according to an embodiment of this invention. The flow chart diagram 50 in FIG. 2 begins at 52 where the wireless network (i.e., a radio network controller) receives a measurement report from the mobile station 40 over the existing link (i.e., with the serving base station 38) as the mobile station 40 is in the cell 28. Depending on the conditions at that time, the measurement report may include a handoff request from the mobile station. At 54 (in FIG. 3) the network receives the measurement report from the mobile station 40 over the existing link through the serving base station 38.

At 56, the network determines whether a handoff is desired. In some examples, the handoff is triggered by the mobile station request for a handoff. In other circumstances, the network may initiate a handoff to better manage network resources using known selection criteria for such situations. Once a handoff decision is made, the network communicates with a target base station (i.e., base station 32, for example) to setup a new link between the target base station 32 and the mobile station 40. Such communication is schematically shown at 58 in FIG. 3 to represent communications between the network components and the target base station. Such communications include, for example, a radio link setup request to the target base station, a response from the target base station, information regarding a packet data convergence protocol, which in one example is a data link layer protocol for packet switch data whose main function is header compression, and a radio link control signal, whose functions correspond to segmentation and retransmission. A variety of known signals or information to meet the needs of a particular situation may be used for setting up the new link with the target base station.

Based on information regarding the target base station, the network sends an active set update message to the mobile station 40 over the existing link with the serving base station 38. This is shown at 60A in FIG. 2. In one example, at the same time, the target base station (or the new link) begins the process of uplink synchronization at 60B and starts transmitting on a physical control channel (i.e., pilot signal, etc.). The uplink synchronization is based upon the received physical layer control information provided by the network at 58.

In one example, at the same time, physical layer control information for the mobile station 40 to accomplish downlink synchronization is transmitted over the existing link to the mobile station 40.

At 62, the new link achieves uplink synchronization. At 64, the mobile station 40 receives the active set update message, updates the active set to replace the existing link with the new link and transmits an active set update confirmation message to the network over the new link.

In one example, the mobile station begins downlink synchronization at essentially the same time using the physical control information regarding the new link that was received by the mobile station over the existing link. At 66 in FIGS. 2 and 3, the mobile station 40 achieves downlink synchronization.

At 68, the active set update confirmation from the mobile station 40 is received by the network. Signaling between the network and the old link for releasing the old link is schematically shown at 70. At 72, the existing link has been released and no longer receives or transmits any communications between the network and the mobile station 40.

By not releasing the old link until after receiving a confirmation message regarding the new link in a sequence as just described, the hard handoff process of this example includes making the new link connection before breaking the existing link connection. This represents an improvement over other hard handoff procedures where the making and breaking of the new and existing links occurred simultaneously. At the same time, however, the mobile station 40 in this example only maintains one member in its active set at all times. That is, the mobile station 40 replaces the existing link with the new link in the active set.

In one example, if the network does not receive the active set update confirmation from the mobile station 40 within a selected time after transmitting the active set update message, then the network proceeds as if the new link could not be established and utilizes the existing link to send another active set update message regarding the same target base station or a different target base station, for example. By not releasing the existing link until after receiving confirmation that the mobile station has updated the active set, the disclosed example avoids potential call drops associated with other hard handoff procedures.

The speed with which the example handoff process is completed is important. One example includes using a prediction algorithm on the network side to expedite the hard handoff process. Based upon periodic measurement reports from the mobile station, the network predicts the relative strength of pilot signals in a next measurement period. This prediction allows the network to make a faster handoff decision and to be able to switch to the strongest possible link when the link quality of an existing link between the mobile station and a serving base station degrades quickly. Given this description, those skilled in the art will be able to develop the detailed workings of such a prediction algorithm to meet their particular needs.

Another feature of the disclosed example is that all user data for a mobile station involved in the example handoff process is buffered during the handoff process. In other words, all data from the mobile station is buffered at the mobile station and all data at the network side is buffered at the network side until the handoff process is complete. This further allows fast and reliable switching to the strongest target base station while avoiding soft handoff for high speed shared channels and the associated dedicated channels.

Another feature of the disclosed example includes minimizing replacement hysteresis associated with replacing the existing link with the new link. In one example, a lower hysteresis threshold than that used in a typical soft handoff procedure facilitates the example hard handoff process. In one example, a replacement hysteresis threshold of approximately 0.25 dB is used as the threshold for deciding when to handoff between an existing link and the target base station or new link. Other examples use thresholds between about 0.2 dB and about 0.5 dB. The replacement hysteresis threshold level in the illustrated example is set high enough to avoid the so-called ping-pong effect when the pilot signal strengths of two base stations vary repeatedly over time. At the same time, using a smaller threshold compared to soft handoff thresholds, which typically are on the order of 1 dB, speeds up the hard handoff process of the disclosed example.

The disclosed example handoff process allows for quickly switching between base stations and utilizes simplex operation. Avoiding soft handoff for dedicated channels in CDMA systems, for example, resolves the problem of tight synchronization between cells, which is otherwise needed to satisfy latency requirements. The disclosed example reduces the number of Walsh codes per user since each mobile station is connected to only one cell using only one link and one base station in an active set at all times. Accordingly, simplex operation is used for the dedicated channels and high data rate shared channels, which provides the advantage of potentially decreasing interference and increasing system capacity.

The disclosed example includes making the new link before breaking the existing link but no soft combining is used in the downlink (i.e., by the mobile station) and no frame selection is used in the uplink (i.e., by the radio network controller).

The disclosed example allows for switching between cells or base stations while avoiding soft handoff. This eliminates the need for tight synchronization between cells and framing protocol between nodes to guarantee latency requirements. The disclosed example is less costly in terms of the required number of Walsh codes used per mobile station. Moreover, the disclosed example maintains link quality during a fast hard handoff procedure by establishing the new leg before releasing the old leg without using soft combining in the downlink and without frame selection in the uplink, both of which have been used for typical soft handover procedures.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of communicating between a mobile station, a serving base station and a target base station comprising:
    establishing a new link between the target base station and the mobile station before releasing an existing link between the mobile station and the serving base station while having only the existing link in an active set for the mobile station before releasing the existing link by
    (A) determining if a handoff is desired between the serving base station and the target base station;
    (B) initiating the new link between the mobile station and the target base station;
    (C) transmitting an active set update message to the mobile station using the existing link between the serving base station and the mobile station;
    (D) achieving uplink synchronization for the target base station to communicate with the mobile station;
    (E) receiving at least one signal over the new link indicating that the mobile station has processed the transmitted active set update message; and
    (F) releasing the existing link responsive to the at least one signal of step (E).

2. The method of claim 1, comprising communicating between the mobile station and the target base station using the new link only after completing step (F).

3. The method of claim 1, wherein step (A) comprises receiving a handoff request from the mobile station and comprising selecting the target base station based at least in part on the received request from the mobile station.

4. The method of claim 1, wherein step (B) comprises providing the target base station with physical layer control information comprising at least a radio link setup request, a packet data convergence protocol and a radio link control.

5. The method of claim 4, wherein step (D) comprises initiating the uplink synchronization responsive to the physical layer control information.

6. The method of claim 1, comprising
    providing physical layer control information for downlink synchronization between the target base station and the mobile station from the target base station to the serving base station; and
    transmitting the provided physical layer control information from the serving base station to the mobile station.

7. The method of claim 6, comprising transmitting the provided physical layer control information to the mobile station prior to completing step (D).

8. The method of claim 1, comprising
    receiving a plurality of measurement reports from the mobile station over the existing link; and
    predicting the desired handoff based on the received measurement reports.

9. The method of claim 8, comprising predicting the target base station.

10. The method of claim 1, comprising receiving at least one signal from the mobile station over the existing link that is indicative of a desire of the mobile station for a handoff and performing step (A) responsive to the received at least one signal.

11. The method of claim 1, comprising buffering bearer traffic between the mobile station and the serving base station while performing steps (A) through (F).

12. The method of claim 1, comprising achieving downlink synchronization between the mobile station and the target base station prior to performing step (F).

13. The method of claim 12, comprising receiving downlink physical layer control information over the existing link, the downlink physical layer control information originating from the target base station for downlink synchronization between the target base station and the mobile station.

14. The method of claim 1, comprising
    determining a characteristic of the existing link;
    determining the characteristic of the new link;
    determining a difference between the determined characteristics; and
    performing step (A) if the determined difference exceeds a threshold that is selected to minimize replacement hysteresis.

15. The method of claim 1, comprising providing at least one signal indicating a desire for the mobile station to handoff from the existing base station using the existing link.

* * * * *